Patented Aug. 8, 1939

2,168,346

UNITED STATES PATENT OFFICE 2,168,346

PROCESS OF PRODUCING PHENOLPHTHALEIN

Max Hubacher, Valley Stream, N. Y., assignor to Ex Lax, Inc., a corporation of New York No Drawing. Application February 11, 1938, Serial No. 190,030

5 Claims. (Cl. 260—337)

The present invention relates to improvements in processes of manufacturing phenolphthalein and has as its objects simplicity and economy and a high grade of purity of the product.

Phenolphthalein can be prepared by various methods, but only the one using a raw material phenol and phthalic anhydride is of commercial interest. The presence of a condensing agent is necessary to bring about the reaction of phenol with phthalic anhydride to form the phenolphthalein. Many substances have been proposed as a condensing agent. Stannic chloride, already used by the discoverer of phenolphthalein, A. v. Baeyer (A. 202, 69 (1880)) is a good agent, but its price is prohibitive and methods of recovery not economical. Concentrated sulfuric acid brings about the reaction between phenol and phthalic anhydride, but the acid also reacts with the phenol to form phenolsulfonic acid. A part of the phenol is thus withdrawn from reacting with the phthalic anhydride; as a consequence, the yield of phenolphthalein is not very satisfactory. Furthermore, when concentrated sulfuric acid is used, varying amounts of tarry and resinous and colored by-products are formed along with the phenolphthalein and these undesirable impurities make the subsequent purification difficult.

The present invention has for its object the production of a crude phenolphthalein in the shortest time possible, having a maximum amount of phenolphthalein and a minimum amount of by-products.

When phenol and phthalic anhydride are heated in the presence of anhydrous commercial zinc-chloride, then the condensation reaction proceeds slowly. After 40 hours at 115–120° C. the yield of phenolphthalein was only about 58% of the theoretical based on the phenol charged (Walter Herzog, Chemiker - Zeitung 51, 84 (1927)). It is also known that phenolphthalein is obtained by heating phenol and phthalylchloride in the presence of a condensing agent, but the yield is reported as only 1.2% of the theoretical (Blicke, Smith and Powers, J. Am. Ch. Soc. 54, 1471 (1932)).

I have discovered that crude phenolphthalein containing a minimum amount of by-products can be produced in relatively short time and in high yields by heating a mixture of phenol, phthalic anhydride and phthalylchloride in the presence of anhydrous zincchloride. The amount of phthalylchloride can be varied within wide limits. 5% of phthalylchloride based on the weight of phthalic anhydride was found to give the beneficial effects, i. e., high yields of phenolphthalein in relatively short time. Mixtures containing 37% phthalylchloride and 63% phthalic anhydride with phenol are equally well suited.

The following examples will illustrate more clearly my process:—

Example No. I

A jacketed enamel kettle is charged with 188 lbs. phenol and 140 lbs. phthalic anhydride. The mass is heated to 35–40° C., the stirrer started and 80 lbs. anhydrous zincchlodie added. After the mixture has become fairly well liquefied, without raising the temperature substantially above 45° C., 10 lbs. of technical phthalylchloride is charged over a period of about 15 minutes. The temperature of the reaction mixture is then raised within about 45 minutes to 118–122° C. The mass is kept stirring at this temperature for 16 hours, the time being counted from the moment the temperature has reached 115°. The semi-solid reaction mass is dropped into a tank containing hot water. After washing it repeatedly with hot water to remove the zincchloride as well as the unreacted phenol and phthalic acid, it is dried. 266 lbs. crude phenolphthalein was obtained. This crude product, after treating it in the usual way with dilute caustic to remove the fluoran, had a yield of 244 lbs. phenolphthalein of melting point 255.8–258.6° C. The yield is 76.7% of the theoretical.

Example No. II

Under the same working conditions, 188 lbs. phenol, 118 lbs. phthalic anhydride, 80 lbs. anhydrous zincchloride and 41 lbs. technical phthalylchloride were heated for 15 hours at 113–117° C., 282 lbs. crude phenolphthalein was obtained and from this, after the removal of the fluoran, 270 lbs. phenolphthalein melting at 256.7°–259.7° C. was obtained. The yield is 84.9% of the theoretical.

Example No. III 188 lbs. phenol, 104 lbs. phthalic anhydride, 90 lbs. anhydrous zincchloride and 61 lbs. technical phthalylchloride were heated for 6½ hours at 125–127° C., 280 lbs. crude phenolphthalein was obtained and after treatment with dilute caustic, 254 lbs. phenolphthalein of melting point 254.6–257.0° C. The yield is 79.8% of the theoretical.

The temperature of reaction is not limited to the range of 113–127° C. Equally good results are obtained at somewhat lower and up to about 135° C. The method is not limited to the proportions given in the above three practical examples. An excess of either one or more of the chemicals may be used, or the chemicals may be added in a different order.

Having described my invention, what I claim and desire to secure by Letters Patent is as follows:

1. A process of producing phenolphthalein by condensing a mixture of phenol, phthalic anhydride and phthalylchloride in the presence of anhydrous zincchloride.

2. A process of producing phenolphthalein which consists in liquefying a mixture of phenol and phthalic anhydride, adding anhydrous zincchloride to the liquid, and then adding phthalylchloride at a temperature not exceeding 80°, thereupon raising the temperature to 100°–140°, and after the formation of the phenolphthalein, removing the unreacted phenol and phthalic anhydride as well as the zincchloride.

3. A process of producing phenolphthalein which consists in heating a mixture of phenol, phthalic anhydride and phthalylchloride to a temperature not exceeding 80°, adding anhydrous zincchloride to the liquefied mixture, and raising and maintaining the temperature of the reaction mass between 100° and 140°.

4. A process of producing phenolphthalein, characterized by mixing phthalic anhydride with phenol, until a homogeneous solution is obtained, adding phthalylchloride and anhydrous zincchloride to the mixture and agitating the mass at a temperature of from 100°–140° until the condensation is completed.

5. A process of producing phenolphthalein which consists in mixing phenol in the proportion of 188 pounds, phthalic anhydride in the proportion within a range of 104 to 140 pounds, anhydrous zincchloride within a range of 80 to 100 pounds and phthalylchloride within a range of 10 to 61 pounds, the mixture being stirred and heated to a temperature of 100°–140° for a period between substantially 6½ to 16 hours, removing the zincchloride, the unreated phenol and the unreacted phthalic anhydride to obtain crude phenolphthalein.

MAX HUBACHER.